United States Patent
Wang (10) Patent No.: US 6,794,792 B2
(45) Date of Patent: Sep. 21, 2004

(54) COLD STRUCTURAL ENCLOSURE FOR MULTI-POLE ROTOR HAVING SUPER-CONDUCTING FIELD COIL WINDINGS.

(75) Inventor: Yu Wang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 71 days.

(21) Appl. No.: 10/292,509

(22) Filed: Nov. 13, 2002

(65) Prior Publication Data

US 2004/0090139 A1 May 13, 2004

(51) Int. Cl.[7] ............................. H02K 3/46; H02K 1/00; H02K 3/00; H02K 3/48
(52) U.S. Cl. ................. 310/270; 310/261; 310/179; 310/52
(58) Field of Search ................. 310/270, 261, 310/179, 52, 40 R (56) References Cited

U.S. PATENT DOCUMENTS

| | | | | |
|---|---|---|---|---|
| 3,679,920 A | * | 7/1972 | MacNab et al. | 310/10 |
| 3,742,265 A | * | 6/1973 | Smith, Jr. | 310/52 |
| 3,816,780 A | * | 6/1974 | Smith et al. | 310/52 |
| 3,904,901 A | * | 9/1975 | Renard et al. | 310/52 |
| 3,983,427 A | * | 9/1976 | Ulke | 310/61 |
| 3,991,333 A | * | 11/1976 | Laskaris | 310/52 |
| 4,042,846 A | * | 8/1977 | Sterrett et al. | 310/52 |
| 4,056,745 A | * | 11/1977 | Eckels | 310/52 |
| 4,063,122 A | * | 12/1977 | Kullmann et al. | 310/64 |
| 4,076,988 A | * | 2/1978 | Litz | 310/52 |
| 4,085,343 A | * | 4/1978 | Hasegawa et al. | 310/52 |
| 4,117,357 A | * | 9/1978 | Baumann | 310/52 |
| 4,120,169 A | * | 10/1978 | Eckels | 62/50.7 |
| 4,123,676 A | * | 10/1978 | Cooper et al. | 310/52 |
| 4,146,804 A | * | 3/1979 | Carr, Jr. | 310/52 |
| 4,152,609 A | * | 5/1979 | Cooper et al. | 310/52 |
| 4,176,291 A | * | 11/1979 | Rabinowitz | 310/52 |
| 4,194,137 A | * | 3/1980 | Vinokurov et al. | 310/52 |
| 4,208,598 A | * | 6/1980 | Popov et al. | 310/64 |
| 4,237,392 A | * | 12/1980 | Ying et al. | 310/52 |
| 4,267,473 A | * | 5/1981 | Gamble | 310/52 |
| 4,275,320 A | * | 6/1981 | Baumann et al. | 310/52 |
| 4,277,705 A | * | 7/1981 | Rios | 310/64 |
| 4,295,068 A | * | 10/1981 | Gamble | 310/52 |
| 4,297,603 A | * | 10/1981 | Weghaupt | 310/53 |
| 4,334,599 A | * | 6/1982 | Ritsema et al. | 188/73.45 |
| 4,342,932 A | * | 8/1982 | Glebov et al. | 310/52 |
| 4,396,847 A | * | 8/1983 | Weghaupt et al. | 310/52 |
| 4,430,589 A | * | 2/1984 | Sakuyama et al. | 310/52 |
| 4,462,152 A | * | 7/1984 | Okamoto et al. | 29/598 |
| 4,532,445 A | * | 7/1985 | Iwamoto et al. | 310/52 |
| 4,562,641 A | * | 1/1986 | Mosher et al. | 29/598 |
| 4,614,888 A | * | 9/1986 | Mosher et al. | 310/261 |

(List continued on next page.)

FOREIGN PATENT DOCUMENTS

| | | | | |
|---|---|---|---|---|
| JP | 53020508 A | * | 2/1978 | H02K/3/11 |
| JP | 54036511 A | * | 3/1979 | H02K/19/00 |
| JP | 02211052 A | * | 8/1990 | H02K/55/04 |
| JP | 04281362 A | * | 10/1992 | H02K/55/04 |

*Primary Examiner*—Karl Tamai
*Assistant Examiner*—Pedro J. Cuevas
(74) *Attorney, Agent, or Firm*—Nixon & Vanderhye P.C.

(57) ABSTRACT

A rotor for a synchronous machine is disclosed having: a rotor core having a rotor axis; at least one super-conducting coil winding arranged around the rotor core; at least one pair of coil support beams attached to the coil winding and secured to the rotor core, wherein said coil support beams are separated from the rotor core, and a cold coil support cylinder fitted over an outside surface of said beams.

18 Claims, 4 Drawing Sheets

U.S. PATENT DOCUMENTS

| | | | | |
|---|---|---|---|---|
| 4,642,495 A | * | 2/1987 | Mori et al. | 310/52 |
| 4,642,503 A | * | 2/1987 | Ueda et al. | 310/214 |
| 4,808,864 A | * | 2/1989 | Brunet et al. | 310/52 |
| 5,032,748 A | * | 7/1991 | Sakuraba et al. | 310/52 |
| 5,323,080 A | * | 6/1994 | Shahamat et al. | 310/261 |
| 5,325,009 A | * | 6/1994 | Capion et al. | 310/261 |
| 5,350,958 A | * | 9/1994 | Ohnishi | 310/52 |
| 5,532,663 A | | 7/1996 | Herd et al. | 335/216 |
| 5,548,168 A | | 8/1996 | Laskaris et al. | 310/52 |
| 5,666,016 A | * | 9/1997 | Cooper | 310/270 |
| 5,672,921 A | | 9/1997 | Herd et al. | 310/52 |
| 5,774,032 A | | 6/1998 | Herd et al. | 335/216 |
| 5,777,420 A | | 7/1998 | Gamble et al. | 310/261 |
| 5,798,678 A | | 8/1998 | Manlief et al. | 335/216 |
| 5,880,547 A | * | 3/1999 | Shoykhet | 310/91 |
| 6,066,906 A | | 5/2000 | Kalsi | 310/179 |
| 6,140,719 A | | 10/2000 | Kalsi | 310/52 |
| 6,169,353 B1 | | 1/2001 | Driscoll et al. | 310/261 |
| 6,441,521 B1 | * | 8/2002 | Dombrovski et al. | 310/156.01 |
| 6,590,305 B2 | * | 7/2003 | Wang et al. | 310/54 |
| 6,590,308 B2 | * | 7/2003 | Dawson et al. | 310/162 |
| 6,600,251 B2 | * | 7/2003 | Laskaris et al. | 310/270 |
| 6,605,885 B2 | * | 8/2003 | Laskaris et al. | 310/270 |
| 6,605,886 B2 | * | 8/2003 | Laskaris | 310/270 |
| 6,608,409 B2 | * | 8/2003 | Wang et al. | 310/54 |
| 6,617,714 B2 | * | 9/2003 | Laskaris | 310/54 |
| 6,680,549 B2 | * | 1/2004 | Boardman et al. | 310/52 |
| 6,700,288 B2 | * | 3/2004 | Smith | 310/218 |
| 6,727,633 B2 | * | 4/2004 | Laskaris et al. | 310/270 |
| 6,727,634 B2 | * | 4/2004 | Tornquist et al. | 310/270 |

* cited by examiner

Fig. 5

COLD STRUCTURAL ENCLOSURE FOR MULTI-POLE ROTOR HAVING SUPER-CONDUCTING FIELD COIL WINDINGS.

BACKGROUND OF THE INVENTION

The present invention relates generally to a rotor having a super-conductive coil in a synchronous rotating machine. More particularly, the present invention relates to an enclosure for such a rotor.

Synchronous electrical machines having field coil windings include, but are not limited to, rotary generators, rotary motors, and linear motors. These machines generally comprise a stator and rotor that are electromagnetically coupled. The rotor may include a multi-pole rotor core and coil windings mounted on the rotor core. The rotor cores may include a magnetically-permeable solid material, such as an iron-core rotor.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, super-conducting (SC) coil windings have been developed for rotors. SC windings have effectively no resistance and are highly advantageous rotor coil windings.

High temperature SC coil field windings are formed of super-conducting materials that are brittle, and must be cooled to a temperature at or below a critical temperature, e.g., 27° K., to achieve and maintain super-conductivity. The SC windings may be formed of a high temperature super-conducting material, such as a BSCCO ($Bi_xSr_xCa_xCu_xO_x$) based conductor.

In addition, high temperature super-conducting (HTS) coils are sensitive to degradation from high bending and tensile strains. These coils must undergo substantial centrifugal forces that stress and strain the coil windings. Normal operation of electrical machines involves thousands of start-up and shut-down cycles over the course of several years that result in low cycle fatigue loading of the rotor. Furthermore, the HTS rotor winding must be capable of withstanding 25% overspeed operation during rotor balancing at ambient temperature and occasional over-speed at cryogenic temperatures during operation. These overspeed conditions substantially increase the centrifugal force loading on the windings over normal operating conditions.

HTS coils used as the rotor field winding of an electrical machine are subjected to stresses and strains during cool-down and normal operation as they are subjected to centrifugal loading, torque transmission, and transient fault conditions. To withstand the forces, stresses, strains and cyclical loading, the HTS coils must be properly supported in the rotor. These support systems and structures that hold the coils in the rotor should secure the coils against the tremendous centrifugal forces due to the rotation of the rotor. Moreover, these support systems and structures should protect the HTS coils and ensure that the coils do not crack, fatigue or otherwise break.

Developing support systems for HTS coil has been a difficult challenge in adapting SC coils to rotors. Examples of HTS coil support systems for rotors that have previously been proposed are disclosed in U.S. Pat. Nos. 5,548,168; 5,532,663; 5,672,921; 5,777,420; 6,169,353, and 6,066,906. However, these coil support systems suffer various problems, such as being expensive, complex and requiring an excessive number of components. There is a long-felt need for a rotor and coil support system for a HTS coil in a synchronous machine. The need exists for HTS coil support system made with low cost and easy-to-fabricate components.

BRIEF SUMMARY OF THE INVENTION

In a first embodiment, the invention is a rotor for a synchronous machine is disclosed having: a rotor core having a rotor axis; at least one super-conducting coil winding arranged around the rotor core; at least one pair of coil support beams attached to the coil winding and secured to the rotor core, wherein said coil support beams are separated from the rotor core, and a cold coil support cylinder fitted over an outside surface of said beams.

In another embodiment, the invention is a rotor for a synchronous machine comprising: a rotor core having a rotor axis; at least one super-conducting coil winding mounted on the rotor core; at least one pair of coil support beams having an inner slot support the coil winding, said beams symmetrically arranged around the core, and said beams separated by a gap from said core, and a plurality of torque rods spanning and connecting opposite coil support beams, wherein said torque rods are offset from and symmetrically arranged about an axis of the rotor.

BRIEF DESCRIPTION OF THE DRAWINGS

The accompanying drawings in conjunction with the text of this specification describe an embodiment of the invention.

DETAILED DESCRIPTION OF THE INVENTION

Figure 1:
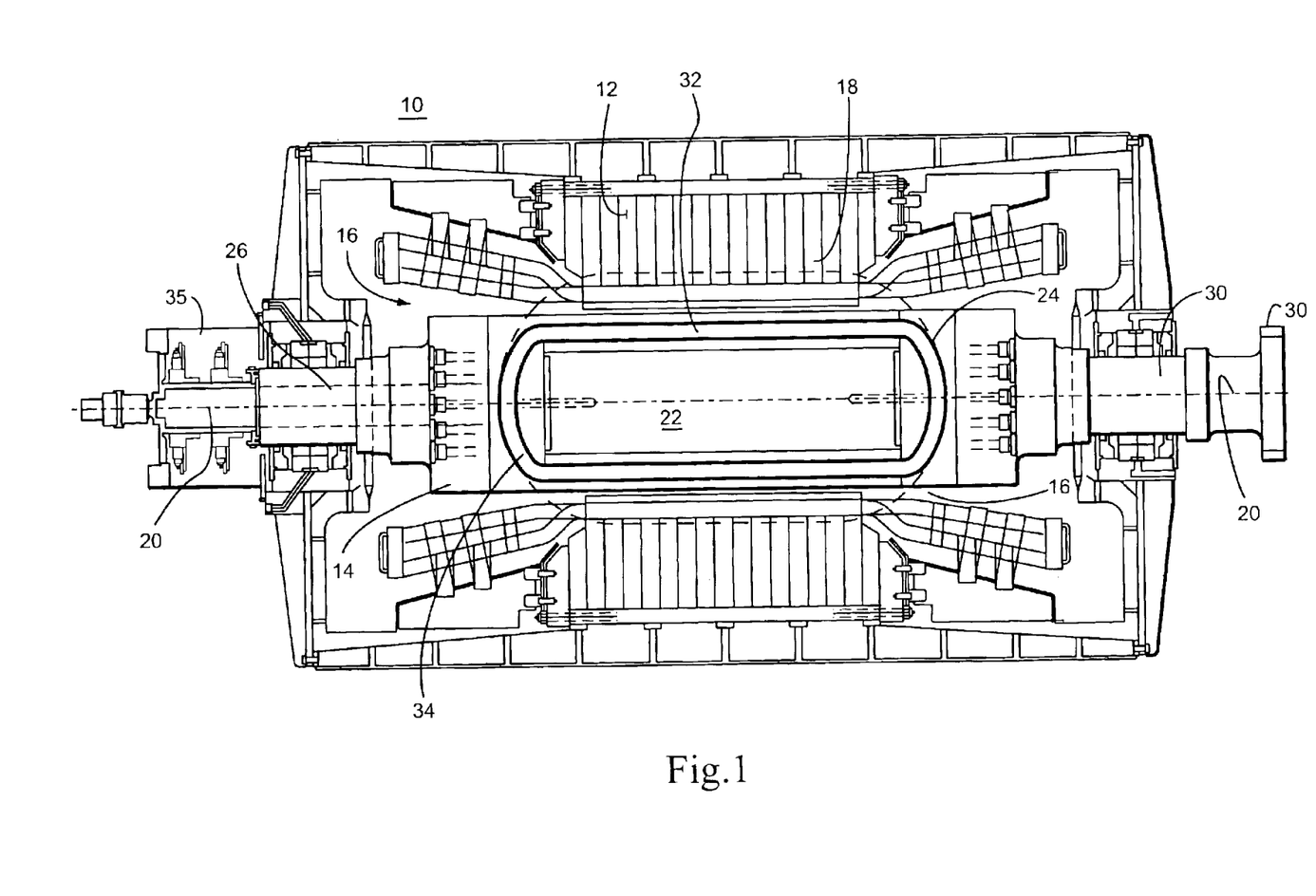
FIG. 1 is a schematic side elevational view of a high-temperature super-conductive (HTS) rotor shown within a stator.

FIG. 1 shows an exemplary synchronous generator machine 10 having a stator 12 and a rotor 14. The stator includes armature winding coils 17 that surround the cylindrical. The rotor fits inside the rotor cavity 16 of the stator. As the rotor turns within the stator, a magnetic field 18 generated by the rotor and rotor coils moves through the stator and creates an electrical current in the windings of the stator coils. This current is output by the generator as electrical power.

The rotor 14 has a generally longitudinally-extending axis 20 and a generally solid rotor core 22. The rotor core 22 has high magnetic permeability, and may be formed of a ferromagnetic material, such as iron. In a low power density super-conducting machine, an iron rotor core provides reduced magnetomotive force (MMF) and minimizes the wire usage. For example, the iron rotor core can be magnetically saturated at an air-gap magnetic field strength of about 2 Tesla.

The rotor core may have two magnetic poles, wherein the poles are at opposite ends of the rotor core. The rotor core electromagnetically interacts with the coil windings to promote the electromagnetic fields around the rotor and stator. The multi-pole rotor 14 may be for a synchronous machine originally designed to include HTS coils. Alternatively, the HTS rotor 14 may replace a copper coil rotor in an existing electrical machine, such as in a conventional generator.

The rotor 14 supports a generally a pair of longitudinally-extending, racetrack-shaped high temperature super-conducting (HTS) coils 24. The super-conductive coils may each be a race-track shape, but may alternatively have a saddle-shape or have some other shape that is suitable for a particular rotor design. The coil support system disclosed here may be adapted for coil configurations other than a racetrack coil shape.

A pair of race-track HTS coils 24 are mounted on the rotor. The dual coil design for a two-pole field winding provides several advantages including simplicity in coil design and in coil support design. In addition, a dual coil design has substantially twice the amount of coil winding of a single-coil rotor. A dual coil design has a substantially greater capacity for power generation (when the coil is incorporated in a rotor of a generator).

The rotor includes a shaft 26 that extends through the core 22 and has ends that are supported by bearings and can be coupled to external devices. A collector end 28 of the shaft 26 includes collector rings that provide an external electrical connection for the coil winding 24. In addition, the collector end shaft may have a cryogen transfer coupling to a source of cryogenic cooling fluid used to cool the HTS coil windings 24 in the rotor. The drive end shaft 30 includes a power coupling to a driving turbine, for example.

The rotor core 22 and shaft 26 may be integrally formed, e.g., from a single iron forging. Alternatively, the rotor core and shaft may be discrete components (and even the core may be a multi-piece core) that are assembled together. The core 22 forging may be made into three pieces to facilitate rotor assembly.

The HTS coil windings 24 includes a high temperature super-conducting conductor, such as a BSCCO ($Bi_xSr_xCa_xCu_xO_x$) conductor wires laminated in a solid epoxy impregnated winding composite. For example, a series of $B_2S_2C_2C_3O$ wires can be laminated and bound in a solid epoxy impregnated coil. The dimensions of each racetrack coil 24 are dependent on the dimensions of the rotor core. Generally, each racetrack coil encircles the magnetic poles of the rotor core, and is parallel to the rotor axis. The HTS coil windings are continuous around the racetrack. The HTS coils form a resistance-free current path around the rotor core and between the magnetic poles of the core.

Figure 2:
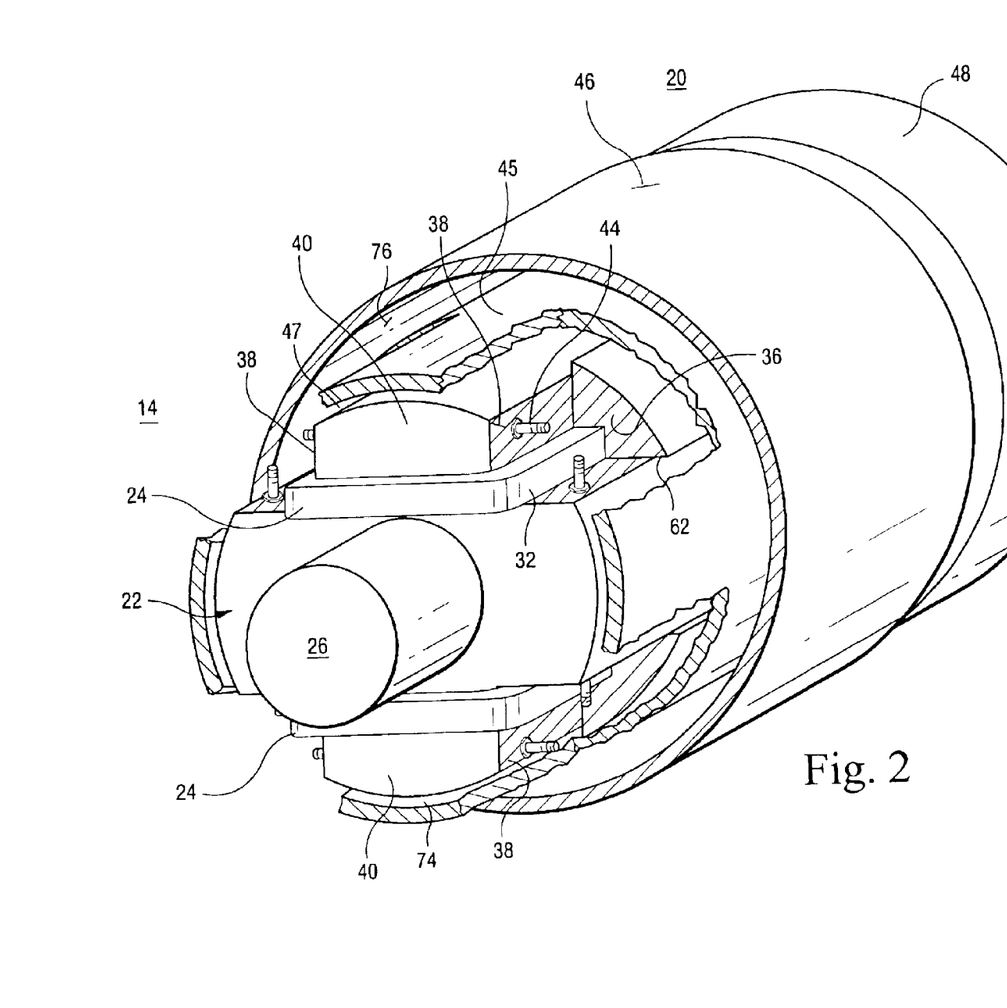
FIG. 2 is a schematic perspective view of the dual HTS racetrack coil rotor, and partially cut-away to show the coil support system.

FIG. 2 shows in a perspective view a partially cut away section of the rotor 20 to illustrate the mounting of the rotor coil winding 24 in slots 38 in the rotor core 22 in which are inserted coil support beams 36. Each HTS racetrack coil winding 24 has generally-straight side portions 32 parallel to the rotor axis 20 and end portions 34 that are perpendicular to the rotor axis. The side portions of the coil are subjected to the greatest centrifugal forces because they are the portions of the coil furthest from the rotor axis 20. These side portions 32 of the coil are supported by a coil support beams 36 that secures the sides 32 of the coil winding and counteract the centrifugal forces that act on the coil sides 32.

The principal loading of the HTS coil 24 in an iron core rotor is from centrifugal acceleration during rotor rotation. An effective coil structural support is needed to counteract the centrifugal forces. The coil support beams 36 are needed especially along the side sections 32 of the coil that experience the most centrifugal acceleration and torsional forces. The coil support beams 36 fit into the slots 38 of the rotor core. The beams extend the length of the rotor core and may be formed of aluminum or stainless steel.

The coil support beams 36 support the twin HTS coils 24 on a rotor core 22, and thermally isolate the hot core from the cryogenic coil windings. The coil support beams 36 fit into slots 38 that extend longitudinally along the length of the rotor. The slots may be triangular in cross-section as shown in FIG. 2, or have some other shape such as rectangular in cross section or semi-circular in cross-section. The support beams 36 may similarly be triangular in cross-section so as to fit in the slot of the rotor, but will generally have a cross-section similar in shape to the cross-section of the slot 38.

The iron rotor core 22 has a generally cylindrical shape suitable for rotation within the stator 12, except for the four slots 38 arranged symmetrically around its axis 20. The core ridges 40 extend radially outward and between adjacent slots 38. The outer surfaces of the ridges are arched.

Figure 3:
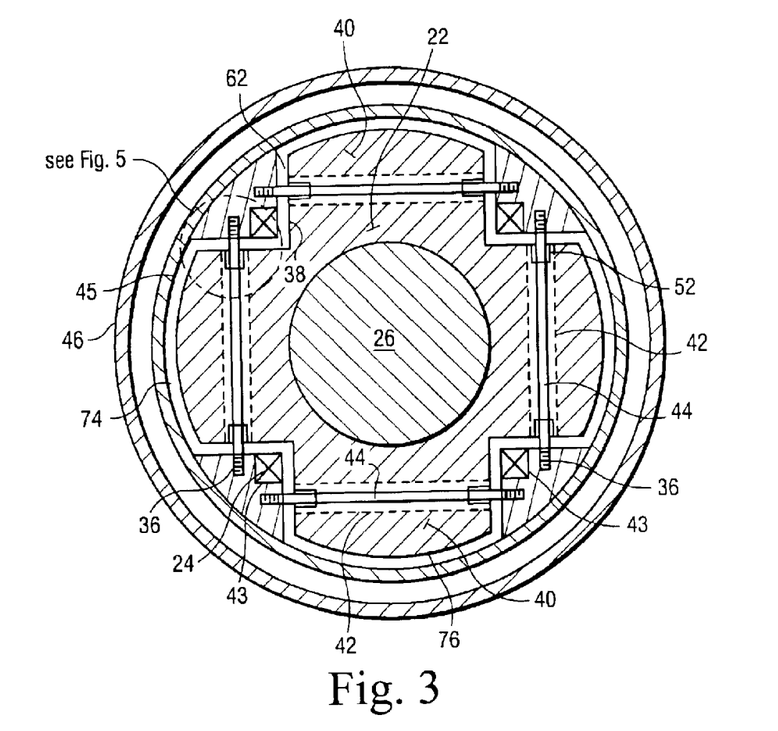
FIG. 3 is a schematic cross-sectional end view of the HTS rotor shown in FIG. 2.

FIG. 3 is a cross-sectional end view of the rotor 14. The dual HTS racetrack coil windings 24 are mounted on the rotor core, but are not in contact with the core. The core 22 is relatively hot, as it is not maintained at the cryogenically cold temperatures at which the coil windings 24 operate. The coil support beams 36 operate to hold the side sections 32 of the coil windings against centrifugal forces and to thermally isolate the cold coil windings from the hot core 22.

Each coil support beam 36 may be a single unit that extends the length of the rotor core or segments that fit into the slots. The beams may have a cross section designed to fit a slot 38 of the rotor core, and an outer beam surface that is arched. The coil support beams fit into the slots but are not in contact with the rotor core. The coil support beams are separated from the core to thermally isolate the beams from the core. The gap between the beams and core is in a vacuum to ensure thermal isolation.

The outside arched surface of the support beams 36 may match the inside surface curvature of the coil support cylinder 45. These abutting arched surfaces (of the beams 36 and support cylinder 45) assist to distribute uniformly the centrifugal forces generated by the coil winding to the support cylinder 45 via the beams 36. The inside surfaces of corner 43 of each beam 36 provide a good load bearing surface to support the outside surfaces of the sides 32 of the rotor coils 24. The cross-sectional shape of the corner 43 of the beams may be square (as shown in FIGS. 2 and 3) trapezoidal, or parallelogram in shape.

The inside corner 43 of each coil support beam 36 is slotted to receive the side 32 of a coil winding 24. The coil winding may be directly attached to the coil support beam 36 as both are maintained at cryogenically cool temperatures. The Thickness of the beam 36 may be relatively thin in order to position the coil winding near the outer perimeter of the rotor core. By using an inside corner of the beam 36 as support surfaces, the coil windings 24 are well supported against centrifugal and torsional forces that occur as the rotor turns.

To support the side sections 32 of coils and the coil support beams 36, torque rods 44 span between the coils and grasp the beams 36 on opposite sides of the ridge 40 through which the rod extends. The torque rods secure each beam 36 from two sides of the beam, where the sides are orthogonal to each other. The torque rods support each beam 36 such that the beam is separated from the rotor core 22 by a small vacuum gap 62 (see FIG. 5).

The torque rods 44 are non-magnetic, straight bars that extend between opposite side sections of the same coil, or between side sections of adjacent coils. The torque rod may be formed of a high strength non-magnetic alloys, such as Inconel X718. The torque rods have at each end a coupling, e.g., a threaded end and a nut, that attaches the rod to the support beam. There may be several torque rods 44 arranged along the length of the rotor core and the sides 32 of the winding 32. The couplings between the torque rods 44 and each support beam 36 allow for adjustments to be made of the position of the beam with respect to the rotor core and the gap 62 between the beam and the core. The support beams are aligned with the core such that the outer surfaces of the beams are radially outward of the outer surfaces of the rotor core.

Conduits 42 for the torque rods 44 extend through each ridge 40 in the core 22. Each conduit is generally perpendicular to the rotor axis 20. The conduits 42 allow torque rods 44 to extend through the core, without contacting the core, and connect adjacent sides 32 of coil windings 24. A separate conduit 42 may be provided for each torque rod 44. Each of the four ridges 40 of the rotor core 22 have conduits to allow the torque rods to extend between opposite sides of each coil, or between adjacent coils.

The conduits have a diameter sufficiently larger than the diameter of the torque rods such that the rods do not come in contact with the sides of the conduits. The gap between the torque rods and conduits provides effective thermal isolation because of the vacuum maintained around the rotor core. The diameter of the conduits is substantially constant, except at their ends near the recessed surfaces of the rotor. At their ends, the conduits may expand to a larger diameter to accommodate a cylindrical bushing 48 (see FIG. 5) for the torque rods.

The conduits 42 have a generally-circular diameter and a straight axis through the rotor ridge 40. The axis of the conduits are generally in a plane defined by the racetrack coil winding 24, if the conduit extends between the opposite sides of the same coil 24. The axis of the conduits are perpendicular to the plane of the coil windings 24 if the conduits extend between the two coils. In addition, the axis of the conduit is perpendicular to the side sections of the coil to which are connected the torque rod that extends through the conduit.

Figure 4:
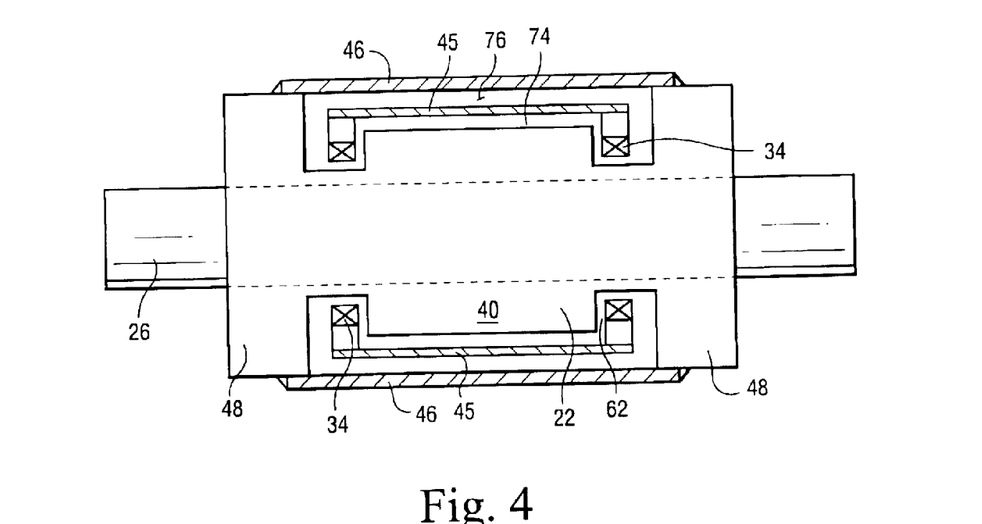
FIG. 4 is a schematic cross-sectional side view of the rotor shown in FIG. 2.

As shown in FIG. 4, the rotor core 22 is enclosed in a cold coil support cylinder 45 and a vacuum vessel and electromagnetic (EM) shield 46. The cold coil support cylinder 45 is either a metallic shell, e.g., aluminum, titanium or stainless steel, or non-metallic shell, e.g., glass or a carbon fiber epoxy composite. The support cylinder 45 fits tightly over the four coil support beam, but does not contact the outer surfaces of the rotor core 22. The coil support cylinder assists the torque rods in supporting the support beams 43 and coils 24 in place on the rotor core. The outer surfaces of the support beams are radially outward of the rotor so that the cryogenically cold support cylinder 45 does not contact the hot rotor core when fitted over the support beams. There is a vacuum gap 74 between the rotor core 22 and the support cylinder 45. Thus, coil support cylinder 45 is thermally isolated from the rotor core.

The rotor may include annular end sections 48 to support the vacuum vessel and EM shield, and to support the ends 34 of the coil windings. The vacuum vessel and electromagnetic (EM) shield 46 is attached to rotor end sections 48 and, thus, are in thermal contact with the rotor. To avoid heat flow from the rotor through the EM shield 46 to the support cylinder 45 a vacuum gap 76 exits between the EM shield 46 and cylinder 45.

The vacuum vessel and EM shield 46 maintains the rotor core 22, support beams 36 and coil windings 24 in a vacuum to promote thermal isolation and minimize heat transfer between the cryogenically cooled windings 24, support beam 36, torsion rods 44 and support cylinder 45, and the hot rotor core 22. The coil winding 24 is shielded from stator-induced magnetic flux by the conductive EM shield and vacuum vessel around the rotor core. The EM shield 46 may or may not be integral vacuum vessel. The outer periphery of the support beams 36 may abut against the inside surface of the vacuum vessel and EM shield.

Figure 5:
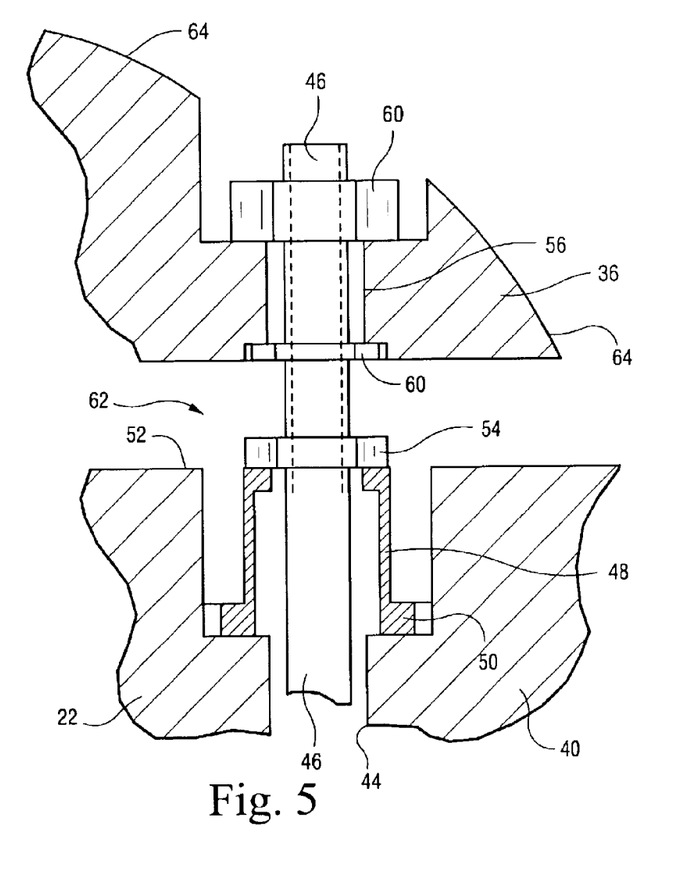
FIG. 5 is a schematic partial side-view and partial cross-sectional view of the tie rods and insulation bushings of the coils support shown in FIG. 2.

FIG. 5 is an enlarged view of the coupling between the torque rods 44 and coil support beams 36, and the spatial relationship between the beams 36, rods 44 and rotor core 22. This relationship provides thermal isolation between the hot rotor core and the cold coil windings 24. The HTS coil windings and structural coil supports, e.g., support beams 36 and torque rods 44, are at cryogenic temperature. In contrast, the rotor core is at ambient "hot" temperature. The coil support beams and torque rods are potential sources of thermal conduction that would allow heat to reach the HTS coils from the rotor core. The rotor core 22 becomes hot during operation. As the coils 24 cooled to cryogenic temperatures, heat conduction into the coils is to be avoided.

To thermally isolate the torque rods 44 from the rotor core 22, the rod is secured to the core without allowing the rod to touch the core. Thus, thermal conduction between the rod and core is avoided. A bushing 48 attaches the torque rod 46 to the core. The bushing is formed of a thermally insulating material such as a ceramic. The bushing is generally cylindrical. An outer ridge 50 on one end of the bushing includes an outer threaded rim that engages a threaded hole 52 in the ridge 40 of the rotor core. The other end of the bushing has an inner rim 52 that engages a nut 54 on the threaded end of the torque rod. The bushing 48 and nut 54 on the opposite ends of the rod, secure the torque rod within the rotor core without allowing for much heat transfer from the core to the torque rod.

The ends of the torque rod, after being secured in the rotor core, are attached to the coil support beams 36. The beams have holes 56 through which extend the rods 46 and recesses 58 to receive a nut 60 to secure the torque rod to the outer surface of the beam. Another nut 60 secures the bottom of the beam to the torque rod.

Figure 6:
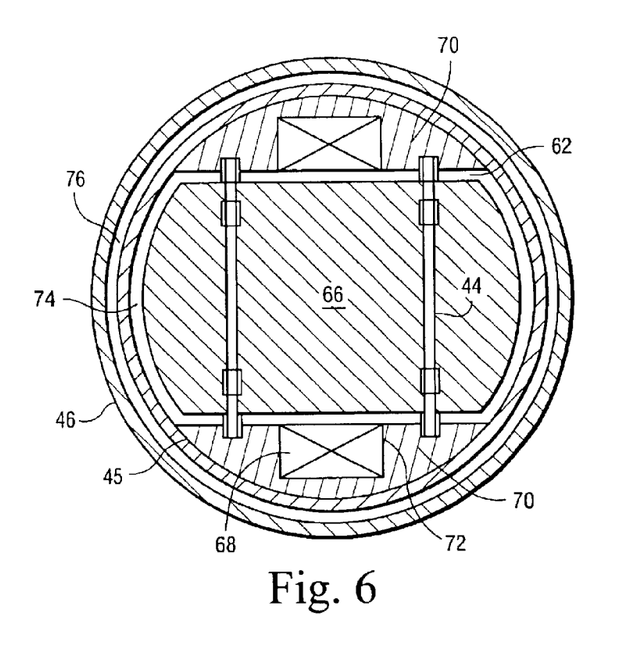
FIG. 6 is a schematic cross-sectional end view of an alternative rotor.

FIG. 6 is a cross-sectional view of an alternative embodiment in which the rotor core 66 supports a single race track coil winding 68. The coil winding is supported by a pair of support beams 70 on opposite sides of the rotor core. The cross-section of the core is generally rectangular. The cross beams includes an inner slot 72 to receive the coil winding 68. The beams 70 are supported by torque rods in the same manner as described above for the dual winding embodiment.

While the invention has been described in connection with what is presently considered to be the most practical and preferred embodiment, it is to be understood that the invention is not to be limited to the disclosed embodiment, but on the contrary, is intended to cover body, and the coil winding having side sections adjacent the flat surfaces.

What is claimed is:

1. A rotor for a synchronous machine comprising:
   a rotor core;
   a plurality of super-conducting coil windings arranged around the rotor core;
   a plurality of coil support beams each attached to one of the coil windings and secured to the rotor core, wherein said coil support beams are each separated from said rotor core and are each seated in a respective longitudinal recess in the rotor core, and
   a coil support cylinder fitted over an outside surface of said beams, wherein said support cylinder, coil support beams and coil windings are at cryogenic temperatures.

2. A rotor as in claim 1 wherein said coil windings are each in a respective plane that is parallel to and offset from the rotor axis.

3. A rotor as in claim 1 wherein the superconducting coils have a race-track shape.

4. A rotor as in claim 1 wherein the coil support cylinder abuts against outer surfaces of said beams, and a gap exists between an outer surface of the rotor core and the coil support cylinder.

5. A rotor as in claim 1 wherein said coil support beam has an inner slot to receive the coil winding.

6. A rotor as in claim 1 wherein the rotor core is a mounted on a rotor shaft and said core is a cross in cross section.

7. A rotor as in claim 1 wherein the super-conduction coils included a high temperature superconducting (HTS) wire extending around the entire coil.

8. A rotor as in claim 1 further comprising torque rods extending between adjacent support beams and connecting the adjacent coil support beams.

9. A rotor as in claim 2 further comprising torque rods connecting the coil support beams and said torque rods are offset from a rotor axis.

10. A rotor as in claim 1 further comprising torque rods connecting adjacent coil support beams, and extending through conduits in the rotor core.

11. A rotor as in claim 2 further comprising torque rods extending between and connecting the coil windings, and wherein said torque rods are perpendicular to the respective planes of the coils.

12. A rotor as in claim 1 wherein the rotor core is an iron core body.

13. A rotor as in claim 2 further comprising torque rods connecting adjacent coil support beams and extending through conduits in said rotor core, and said torque rods and coil support beams being thermally isolated from said rotor core.

14. A rotor as in claim 1 wherein the coils are saddle coils.

15. A rotor as in claim 1 wherein the rotor core is maintained at an ambient hot temperature.

16. A rotor for a synchronous machine comprising:
    a rotor core having a rotor axis and having a plurality of planar outer surfaces extending a length of the rotor core;
    at least one super-conducting coil winding mounted on the rotor core and having end sections extending beyond the rotor core;
    at least one pair of coil support beams having an inner slot support for the coil winding, said beams symmetrically arranged around the core, and said beams separated by a gap from said core, wherein said outer support beams have outer surfaces radially outward of at least one of the planar outer surfaces of the rotor core and,
    a plurality of torque rods spanning and connecting opposite coil support beams, wherein said torque rods are offset from and symmetrically arranged about an axis of the rotor.

17. A rotor as in claim 16 further comprising a cylindrical support cylinder surrounding the coil support beams.

18. A rotor as in claim 16 wherein the coil winding, support beams and support cylinder are maintained at cryogenically cold temperatures, and the rotor core is maintained at an ambient hot temperature.

* * * * *

UNITED STATES PATENT AND TRADEMARK OFFICE
CERTIFICATE OF CORRECTION

| | | |
|---|---|---|
| PATENT NO. | : 6,794,792 B2 | Page 1 of 1 |
| APPLICATION NO. | : 10/292509 | |
| DATED | : September 21, 2004 | |
| INVENTOR(S) | : Yu Wang | |

It is certified that error appears in the above-identified patent and that said Letters Patent is hereby corrected as shown below:

In column 1, line 5; below the title insert:

--This invention was made with U.S. Government support under contract No.DE-FC36-02GO11100 awarded by the Department of Energy. The Government has certain rights in this invention.--

Signed and Sealed this

Twelfth Day of August, 2008

JON W. DUDAS
*Director of the United States Patent and Trademark Office*